United States Patent [19]

Katagiri et al.

[11] Patent Number: 4,774,619
[45] Date of Patent: Sep. 27, 1988

[54] MAGNETIC DISK CARTRIDGE WITH AN IMPROVED CENTER CORE

[75] Inventors: Shingo Katagiri; Kiyoo Morita, both of Kanagawa, Japan

[73] Assignee: Fuji Photo Film Co., Ltd., Kanagawa, Japan

[21] Appl. No.: 76,434

[22] Filed: Jul. 21, 1987

[30] Foreign Application Priority Data

Jul. 21, 1986 [JP] Japan .............................. 61-110571[U]

[51] Int. Cl.$^4$ ............................................. G11B 23/03
[52] U.S. Cl. ..................................................... 360/133
[58] Field of Search ......................... 360/133, 135, 97

[56] References Cited

U.S. PATENT DOCUMENTS

| 4,590,532 | 5/1986 | Saito | 360/133 |
| 4,630,156 | 12/1986 | Saito | 360/133 |
| 4,695,910 | 9/1987 | Maruyama et al. | 360/133 |

*Primary Examiner*—John H. Wolff
*Attorney, Agent, or Firm*—Sughrue, Mion, Zinn, Macpeak, and Seas

[57] ABSTRACT

A core for a magnetic disk to be inserted onto a spindle. The spindle has an engaging surface for contacting two circumferential rigid points on the core and for contacting a circumferential spring which centers the disk on the spindle. According to the invention, the heights of the contacting points and of the spring do not exceed the height of the engaging surface of the spindle.

5 Claims, 3 Drawing Sheets

MAGNETIC DISK CARTRIDGE WITH AN IMPROVED CENTER CORE

BACKGROUND OF THE INVENTION

1. Field of the Invention

The present invention relates to a magnetic disk cartridge in which a magnetic disk sheet, which is an extremely thin disk-like recording medium, is rotatably accommodated. It particularly relates to a magnetic disk cartridge in which a center core of the magnetic disk sheet is improved.

2. Background of the Invention

A magnetic disk cartridge of a so-called video floppy or the like for recording a still picture, using a flexible magnetic disk sheet having a diameter of 47 mm, is provided with a center core at a center of the disk sheet. The center core has a hole at its center for close insertion of a spindle of a recording/reproducing apparatus such as an electronic still camera, a television photoplayer, or the like. When the magnetic disk cartridge is loaded in the recording/reproducing apparatus, the rotation driving spindle is closely inserted into the hole of the center core so as to position the magnetic disk sheet. The center core is magnetically attached to a magnetic chuck so as to be driven to rotate.

The center core is provided with a spring for urging the spindle in one direction so that the center core is positioned concentrically with the spindle when the spindle is fittingly inserted in the center core. When the spring portion is made, for example, of a thin metal plate, the thin metal spring portion is provided in the central hole of the center core so that elasticity exists when the spindle is inserted in the core. Alternatively, a thin plastic spring portion formed integrally with the center core is also known. Similarly to the metal spring, the plastic spring portion also generates elasticity owing to the insertion of the spindle to urge the spindle so as to perform positioning of the center core.

There has been a problem, however, in that if accurate positioning of the center core is not carried out, the reproducing output is lowered in a recording/reproducing operation. The magnetic head then picks up a signal of an erroneous track owing to a slight error in centering because the width of a track is extremely narrow, about 60 μm, thereby making it impossible to perform accurate recording/reproducing.

The problem described above is apt to occur particularly in the case where the center core includes such an integral plastic spring portion, as shown in FIGS. 1 and 2. Referring to FIGS. 1 and 2, the problem in the prior art will be described.

FIG. 1 is a plan view showing the state in which a spindle 6 is fittingly inserted into a center core 1, and FIG. 2 is a cross section taken along line II—II in FIG. 1. As shown in FIG. 1, the center core 1 is arranged to contact with the spindle 6 at three positions. One contacting position is on a spring portion 2 and the other two are on two receiving surfaces 3. An outer circumferential wall 8 of the spring portion 2 is positioned opposite to an inner circumferential wall 4 of the center core 1 through a gap 5 provided therebetween so as to press the spindle 6 with a suitable pressure at a substantially middle portion of the spring portion 2.

As shown in FIG. 2, however, there occurs such a state in which the spring portion 2 is slanted relative to the spindle 6. In such a state, the spring portion 2 generates unnecessarily large pressing force acting onto the spindle 6 so that a yielding phenomenon of the spring portion 2 is accelerated. Therefore, wear is increased in the spring portion at the portion where the spring portion 2 contacts the spindle 6.

Further, a problem of wear in the center core 1 occurs in the step of insertion. That is, the spindle 6 is inserted at a slant into the center core 1 relative thereto. Therefore, in the initial and middle stages the diameter required to accomodate the spindle 6 becomes effectively large due to the tilted position of the spindle 6. Stated differently, the diameter of the fitting hole of the center core 1 becomes smaller where the spring is slanted inward. As a result, yielding and wear are generated in the spring portion 2 because of an increase in contacting force between the spindle 6 and the center core 1. Particularly in that case, the spring portion 2 contacts with the spindle at only one point of the spring portion 2, so that the wear becomes larger. Accordingly, the center of the spindle 6 is displaced from the center of the center core 1, resulting in the problem described above. If the magnetic disk cartridge is repeatedly used, the yielding and wear increase so that eccentricity arises between the spindle 6 and the center core 1.

SUMMARY OF THE INVENTION

It is therefore an object of the present invention to solve the problems in the prior art.

It is another object of the present invention to provide a magnetic disk cartridge provided with a center core the fitness of which with a spindle can be well maintained for a long time.

In order to attain the above object, according to an aspect of the present invention, the magnetic disk cartridge comprises a magnetic disk sheet and a center core formed at a center of the magnetic disk sheet so that a rotation driving spindle can be inserted into the center core. The center core has an innermost circumferential wall provided with receiving surfaces arranged to contact with an engaging surface of an outer circumference of the spindle and a spring portion for centering the disk sheet. A width of each of the receiving surfaces and the spring portion in the direction of a thickness of the core is made to be small so that the receiving surfaces and the spring portion do not project toward a top end of the spindle beyond an upper end of the engaging surface.

BRIEF DESCRIPTION OF THE DRAWINGS

Other objects and advantages of the invention will become apparent during the following discussion of the accompanying drawings, wherein.

DETAILED DESCRIPTION OF THE PREFERRED EMBODIMENTS

Figure 1:
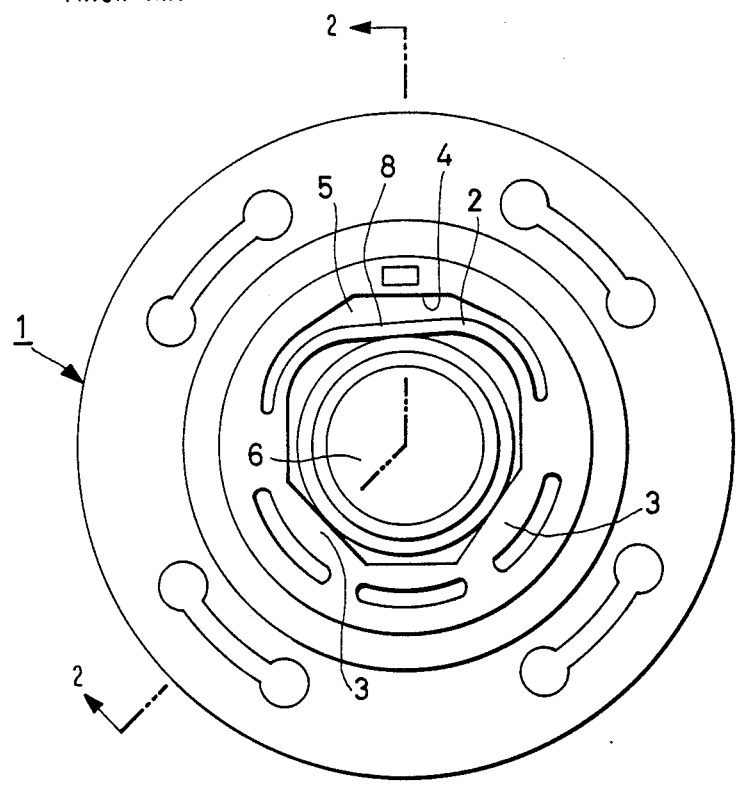
FIGS. 1 and 2 are a plan view and a cross section of the conventional center core respectively.
Figure 2:
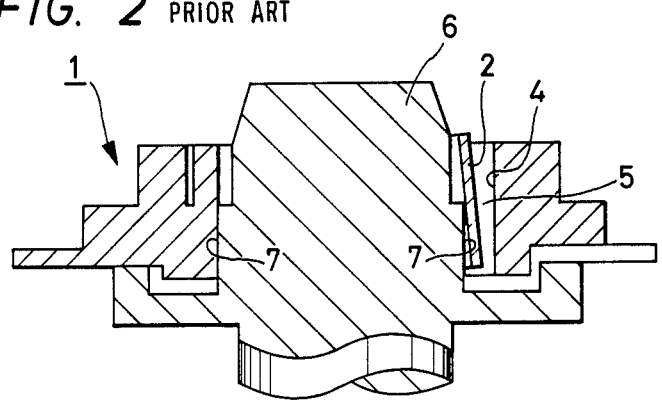

Referring to the drawings, an embodiment of the present invention will be described hereunder.

Figure 3:
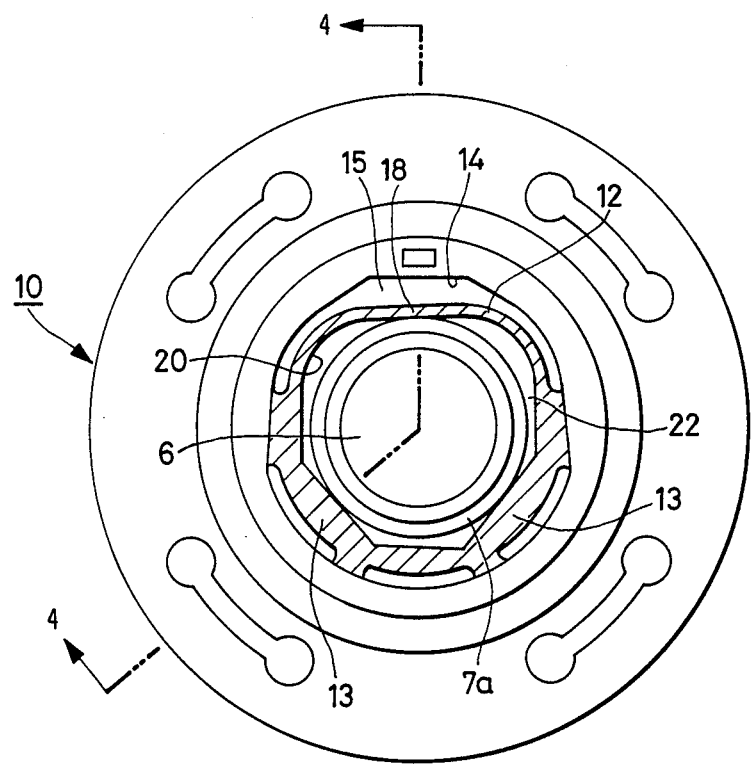
FIG. 3 is a plan view showing a main portion of an embodiment of the magnetic disk cartridge according to the present invention.
Figure 4:
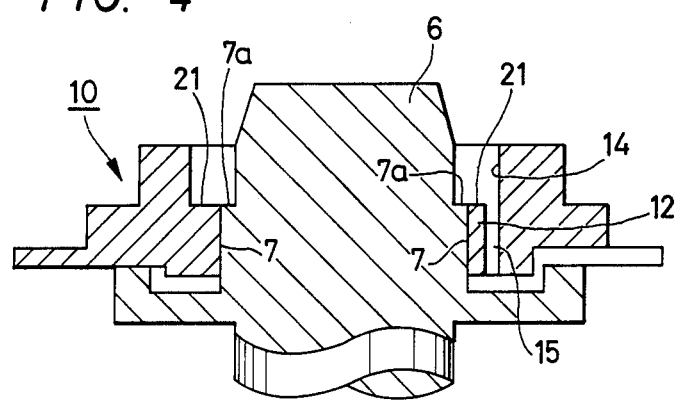
FIG. 4 is a cross section taken on line IV—IV of FIG. 3.

In FIGS. 3 and 4, a center core 10 is provided at a center of a magnetic disk sheet which is made of plastic and is rotatably accommodaed in a magnetic disk cartridge. Receiving surfaces 13 and a spring portion 12 are formed on an innermost circumferential wall 20 of the center core 10 so that they are in contact with an engaging surface 7 of a spindle 6. The spring portion 12 is integrally formed with the core body. An outer circumferential wall 18 is positioned opposite to an inner circumferential wall 14 of the center core 1 through a gap 15 provided therebetween so as to properly press the engaging surface 7 of the spindle 6 at a middle stage of the spring portion 12.

In the parts described above, the arrangement is the same as that of the conventional center core 1. The embodiment according to the present invention, however, has an additional feature in the innermost circumferential wall 20 (hatched portion in FIG. 3). That is, as shown in FIG. 4, the height of the innermost circumferential wall 20 in the direction of thickness of the core is made smaller than that of the conventional center core. As a result, an edge 21 of the innermost circumferential wall 20 is made so as not to project toward the top end of the spindle 6 beyond an upper end 7a of the engaging surface 7 of the spindle 6.

Figure 5:
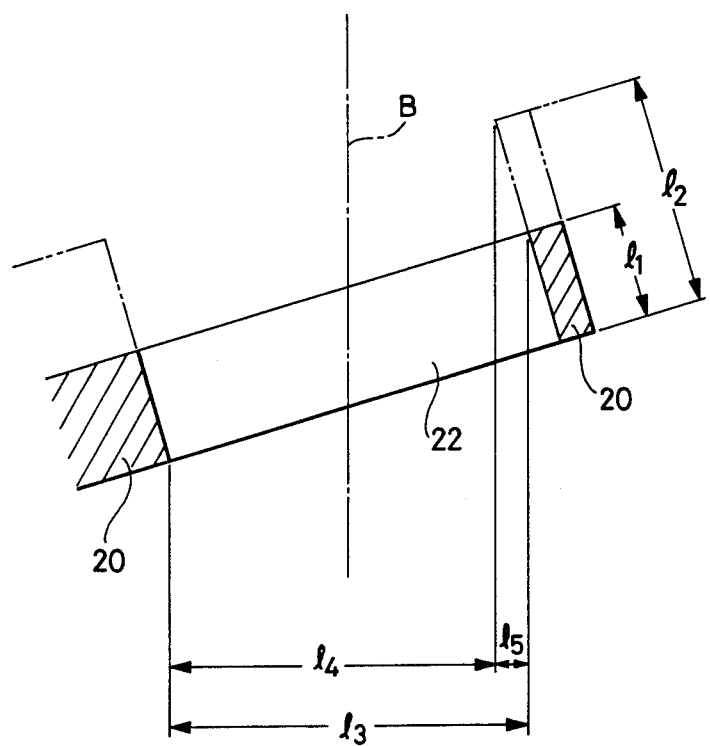
FIG. 5 is a schematic cross section of an inner circumferential wall for explaining the operation according to the present invention.

Accordingly, when the spindle 6 is inserted into the center core 10, the top end of the spindle 6, specifically the upper end 7a of the engaging surface 7, are made into face-to-face contact with the receiving surfaces 13 and the spring portion 12 so that the pressing force is reduced. That is, as shown in FIG. 5, when a height $l_1$ of the innermost circumferential wall 20 in the direction of the thickness of the core is selected to be smaller than a height $l_2$ (shown by one-dotted chain line) of the conventional core. Further, an effective (in the inclined direction with respect to the spindle) inner diameter $l_3$ of a core center hole 22 is made effectively larger by a width $l_5$ than the effective inner diameter $l_4$ in the conventional case with respective to an axis B of the spindle 6. As a result, when the spindle 6 is fittingly inserted in the center core 10, excessive pressing force is prevented from being applied to the spring portion 12 and the receiving surfaces 13 in comparison with the conventional case, so that the fitting is made smooth.

Thus, in the embodiment according to the present invention, the abutting force of the spindle 6 against the spring portion 12 and the receiving surfaces 13 of the center core 10 can be made small when the spindle 6 is inserted into the center core 10. Therefore, wear of the spring portion 12 and the receiving surfaces 13 as well as deformation of the spring portion 12 can be suppressed to thereby enable stable fitness to be effected.

Further, the height of the innermost circumferential wall 20 in the direction of the core thickness is selected to be small so that the center core 10 is easily separated from a metal mold when it is molded.

Although the height of the entire innermost circumferential wall 20 in the direction of the core thickness is selected to be small in the embodiment, the present invention is not limited to such an embodiment.

If the height in the core thickness direction of at least the spring portion 12 and the receiving surfaces 13 which are in contact with the spindle 6 is selected to be small, the same effect as that of the embodiment described above can be obtained even if the height of the entire innermost circumferential wall 20 is not made small.

Although in the embodiment described above, the plastic spring portion 12 is integrally formed with the center core 10, it is a matter of course that the present invention can be applied to a magnetic disk cartridge in which a spring portion is made of metal.

As described above, in the magnetic disk cartridge according to the present invention, the height in the core thickness direction of the spring portion and receiving surfaces of the center core is selected to be small so as not to project beyond the upper end of the engaging surface of the spindle, so that a contacting pressure between the spindle and the spring portion and the receiving surfaces can be effectively reduced. Also, wear can be prevented from occurring in the spring portion and the receiving surfaces. Further, the spring portion can be slightly deformed so that a yielding phenomenon in the spring portion can be suppressed. The height in the core thickness direction of the portion of the innermost circumferential wall of the center core (the portions where the spring portion and the receiving portions are formed) is selected to be small. This reduced height results in such an effect that the center core is easily separated from the metal mold when it is molded.

Therefore, according to the present invention, the superior magnetic disk cartridge can be provided in which satisfactory centering of the spindle relative to the center core can be assured for a long time and in which no track displacement is generated relative to magnetic head.

What is claimed is:

1. A magnetic disk cartridge having a magnetic disk sheet with a center core having an aperture, said core being insertable over a rotatable stepped drive spindle, said drive spindle having an axially extending engaging surface at an outer circumference thereof, wherein said center core comprises an innermost and inner circumferential wall, said innermost circumferential wall having a receiving surface contactable with said engaging surface and a spring portion for centering said disk sheet, a height of said spring portion being less than a height of said inner wall of said core and not extending axially beyond said engaging surface when said core is seated on said driving spindle.

2. A magnetic disk cartridge as recited in claim 1, wherein a height of said receiving surface is less than a height of said core.

3. A magnetic disk cartridge as recited in claim 2, wherein said core has a bottom surface for seating upon a portion of said spindle extending radially outwardly from said engaging surface.

4. A magnetic disk cartridge as recited in claim 2, wherein said receiving surface contacts said spindle at two circumferential points.

5. A magnetic disk cartridge as recited in claim 3, wherein said spring portion extends circumferentially around said inserted spindle and is elastic in a radial direction of said inserted spindle.

* * * * *